US005401352A

United States Patent [19]

Matsushita et al.

[11] Patent Number: 5,401,352

[45] Date of Patent: Mar. 28, 1995

[54] LABEL PRINTER

[75] Inventors: Izumi Matsushita; Kazuhiro Fushimi, both of Shizuoka, Japan

[73] Assignee: Tokyo Electric Co., Ltd., Tokyo, Japan

[21] Appl. No.: 65,889

[22] Filed: May 25, 1993

[30] Foreign Application Priority Data

May 25, 1992 [JP] Japan .................................. 4-132219

[51] Int. Cl.$^6$ .............................................. B32B 31/00

[52] U.S. Cl. .................................... 156/384; 101/288; 156/277; 156/541

[58] Field of Search ................ 101/288; 156/277, 384, 156/540, 541

[56] References Cited

U.S. PATENT DOCUMENTS 3,954,545 5/1976 Hamisch, Jr. et al. ............ 156/384
4,614,561 9/1986 Mistyurik ............................ 156/384
5,013,387 5/1991 Goodwin et al. .................... 156/384
5,149,211 9/1992 Pettigrew et al. .............. 156/384 X
5,254,206 10/1993 Wing .............................. 156/384 X

FOREIGN PATENT DOCUMENTS 546455 6/1993 Japan .
546715 6/1993 Japan .
568813 9/1993 Japan .
5297159 11/1993 Japan .

*Primary Examiner*—David A. Simmons
*Assistant Examiner*—Paul M. Rivard
*Attorney, Agent, or Firm*—Oblon, Spivak, McClelland, Maier & Neustadt

[57] ABSTRACT

A label printer for printing an image on a plurality of labels attached to a base sheet and issuing the labels on which the image has been printed. The label printer includes a platen roller, a pinch roller adapted to separably contact the platen roller through the base sheet, a slide frame for supporting the pinch roller so that the pinch roller is movable between a contact position and a separate position with respect to the platen roller, and a frame stopper for releasably holding the slide frame in the contact position where the pinch roller is in contact with the platen roller. When the frame stopper is released from the slide frame, the slide frame is slid to reach the separate position to widely separate the pinch roller from the platen roller. Accordingly, the base sheet can be easily inserted through the space defined between the platen roller and the pinch roller separated therefrom.

18 Claims, 14 Drawing Sheets

LABEL PRINTER

BACKGROUND OF THE INVENTION

1. Field of the Invention

The present invention relates to a label printer for printing a given image on a label and, more particularly, to a label printer using a label sheet consisting of an elongated base sheet and a plurality of labels attached to the base sheet to issue the labels separated from the base sheet after printing the image.

2. Discussion of the Related Art

FIGS. 13 to 17 show a label printer disclosed in Japanese Utility Model Application Nos. Hei 3-98970 and Hei 3-98971 both filed by Tokyo Electric Co., Ltd., the employer of the present applicant. The label printer will be described as the related art of the present invention with reference to FIGS. 13 to 17.

As shown in FIG. 13, the label printer generally denoted by reference numeral 1 includes a body housing 2. A label printing section 3 and a sheet supplying section 4 are provided in the body housing 2 at the front and rear portions thereof, respectively. A label sheet 5 in the form of a roll is rotatably supported in the sheet supplying section 4. The label sheet 5 is unwound to be supplied from the sheet supplying section 4 through a sheet feed path A to the label printing section 3. The label printing section 3 includes a bracket 6 pivotably mounted on a pivotal shaft **6*b* which is supported to the body housing 2, a line head 7 supported to the bracket 6, and a platen roller 8 rotatably supported to the body housing 2. The line head 7 is adapted to separably contact the platen roller 8 through the label sheet 5. A label separating member 9 is mounted to the body housing 2 so as to extend substantially parallel to the platen roller 8** on the front side thereof.

The label sheet 5 consists of an elongated base sheet 11 and a plurality of individual labels 10 separably attached to the base sheet 11. Each label 10 is adapted to be separated from the base sheet 11 by the label separating member 9 after a given image is printed on each label 10 by the line head 7. After separating each label 10, the base sheet 11 is fed and ejected by a sheet eject unit 12. As shown in FIGS. 14A to 16, the sheet eject unit 12 includes a unit frame 13. A pair of recesses 14 are formed on the upper surface of the unit frame 13 at the laterally opposite ends thereof. A pair of bearings 16 are slidably received in the recesses 14 through a pair of coil springs 15, respectively. A roller shaft **17*a* of a pinch roller 17 is rotatably supported at its opposite ends by the bearings 16. The sheet eject unit 12 further includes a U-shaped swing member 18 for displacing the pinch roller 17 with respect to the platen roller 8. The swing member 18 has a laterally extending bar portion 19 and a pair of swing arms 20 extending rearward from the bar portion 19 at the laterally opposite ends thereof in perpendicular relationship thereto. The swing arms 20 are formed at their rear ends with a pair of recesses 21 open to the upper side, respectively. The recesses 21 engage a pair of support pins 22 formed at the rear end portion of the unit frame 13 so as to project laterally outwardly. Thus, the swing member 18 is swingably supported to the unit frame 13. The lower edges of the swing arms 20 of the swing member 18 normally abut against the roller shaft 17*a* of the pinch roller 17. The bar portion 19 of the swing member 18 is formed in a substantially tubular configuration so as to receive a cam shaft 24. A pair of bearing holes 23 are formed at the front end portion of the unit frame 13 so as to rotatably support the cam shaft 24 at the opposite ends thereof. The cam shaft 24 received in the bar portion 19 abuts against a pair of upper edges 19*a* of the bar portion 19 against the biasing force of the coil springs 15 normally applied in an upward direction. The cam shaft 19 has a pair of semicircular cam portions 26 formed by cutting. The cam portions 26 engage the upper edges 19*a* of the bar portion 19, respectively. An operating lever 25 is connected to one end of the cam shaft 24**.

As shown in FIG. 17, a pair of support frames 27 are fixedly mounted on the body housing 2. The pivotal shaft **6*b* is fixedly supported at its opposite ends to the support frames 27. The bracket 6 is pivotably supported to the pivotal shaft 6*b*. The bracket 6 and the sheet eject unit 12 are disposed between the support frames 27 in such a manner that the pinch roller 17 is adapted to separably contact the platen roller 8** from the under side thereof.

In the label printer 1 mentioned above, a given image such as commodity information is printed on each label 10 of the label sheet 5 carried on the platen roller 8 by thermal scanning of the line head 7. After printing the image, the base sheet 11 is bent at an acute angle by the label separating member 9 to separate each label 10 from the base sheet 11 and project a front half portion of the label 10 out of the body housing 2. After separating the label 10 from the base sheet 11, the base sheet 11 only is fed by the platen roller 8 and the pinch roller 17, and is ejected out of the body housing 2. In this manner, the issue of the plurality of labels 10 is continuously performed.

As mentioned above, the front half portion of each label 10 on which the image has been printed by the line head 7 is separated from the base sheet 11 and projects out of the body housing 2. Accordingly, an operator can easily draw the issued label 10 and attach it to a commodity (not shown), for example.

In setting the label sheet 5 in the label printer 1, the operating lever 25 is manually operated to rotate the cam portions 2,5 of the cam shaft 24 and thereby lower the swing member 18 engaging at the upper edges **19*a* of the bar portion 19 thereof with the cam portions 26 as shown in FIG. 14B. As a result, the roller shaft 17*a* of the pinch roller 17 engaging the swing arms 20 of the swing member 18 is lowered against the biasing force of the coil springs 15, and accordingly the pinch roller 17 is separated from the pinch roller 8. In this condition, the base sheet 11 is inserted through the space defined between the platen roller 8 and the pinch roller 17. Then, the operating lever 25 is returned to its initial position, thus setting the base sheet 11 between the platen roller 8 and the pinch roller 17 as shown in FIG. 14**A.

In the label printer 1, the pinch roller 17 can be held in a contact position and a separate position with respect to the platen roller 8 by the operation of the operating lever 25. Accordingly, the label printer 1 can eliminate troublesome work in setting the label sheet 5 such that the bar portion 19 of the swing member 18 is kept lowered with an operator's hand and the base sheet 11 is then inserted through the space defined between the platen roller 8 and the pinch roller 17 with the other hand.

However, in the structure wherein the bar portion 19 of the swing member 18 is displaced by rotating the cam portions 26 of the cam shaft 24, displacement of the bar portion 19 is small, so that the pinch roller 17 cannot be largely separated from the platen roller 8. Accordingly, it is difficult to insert the base sheet 11 through the small space between the platen roller 8 and the pinch roller 17. Thus, operability in setting the label sheet 5 is hindered.

To cope with this, it may be considered to increase the displacement of the bar portion 19 of the swing member 18 by enlarging the cam portions 26, thereby increasing an amount of movement of the pinch roller 17. In this case, however, a space to be occupied by the enlarged cam portions 26 becomes large, and a large space for permitting the increased displacement is also required under the swing member 18, resulting in an increase in size of the label printer 1.

SUMMARY OF THE INVENTION

It is accordingly an object of the present invention to provide a label printer which can improve the operability in inserting the base sheet through the space between the platen roller and the pinch roller.

It is another object of the present invention to provide a label printer which can simplify a structure of bringing the pinch roller into contact with or separation from the platen roller.

According to the present invention, there is provided a label printer comprising a body frame; a platen roller rotatably supported to the body frame, for carrying a label sheet consisting of an elongated base sheet and a plurality of labels separably attached to the base sheet; a line head adapted to separably contact the platen roller through the label sheet, for printing an image on the labels; a label separating member for bending the base sheet at an acute angle after printing of the image to separate the labels from the base sheet; a pinch roller adapted to separably contact the platen roller through the base sheet after separating of the labels; a slide frame slidably supported to the body frame for supporting the pinch roller so that the pinch roller is movable between a contact position and a separate position with respect to the platen roller; and frame positioning means for releasably holding the slide frame in the contact position where the pinch roller is in contact with the platen roller.

With this arrangement, when the frame positioning means is released, the slide frame is allowed to largely slide, thereby bringing the pinch roller into wide separation from the platen roller. Accordingly, the base sheet can be easily inserted through the space defined between the platen roller and the pinch roller separated from each other.

Other objects and features of the invention will be more fully understood from the following detailed description and appended claims when taken with the accompanying drawings.

BRIEF DESCRIPTION OF THE DRAWINGS

FIG. 1(*b*) is a view similar to FIG. 1A, illustrating a condition where the pinch roller is separated from the platen roller;

FIG. 14(*b*) is a view similar to FIG. 14(*a*), illustrating a condition where the pinch roller is in separation from the platen roller;

DESCRIPTION OF THE PREFERRED EMBODIMENTS

Figure 1A:
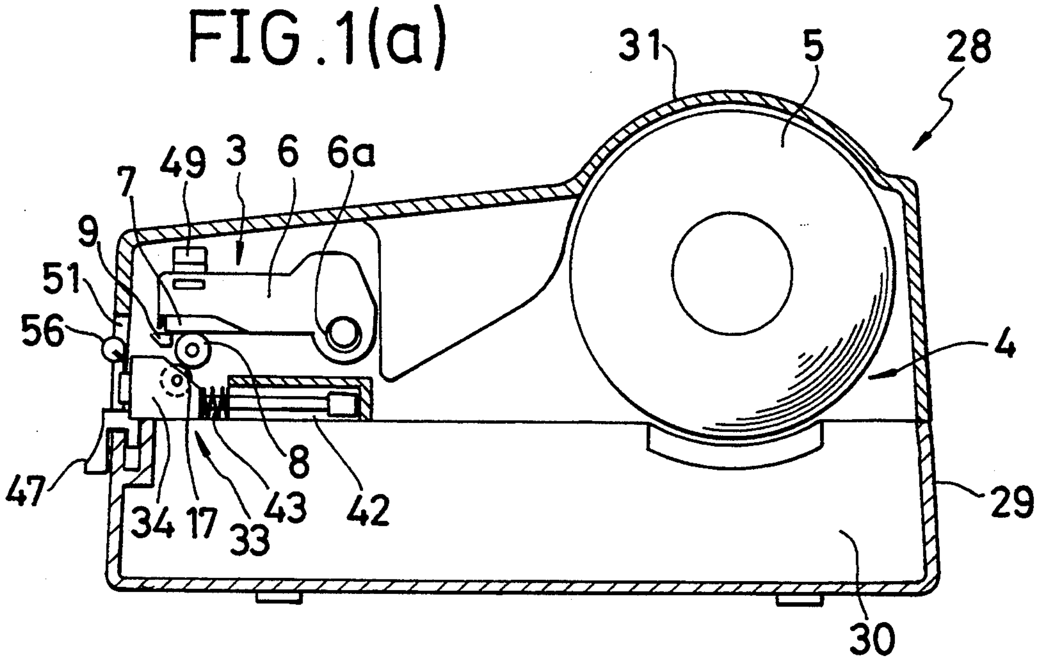
FIG. 1(*a*) is a vertical sectional view of a label printer in a preferred embodiment according to the present invention, illustrating a condition where a pinch roller is in contact with a platen roller.

A preferred embodiment of the present invention will now be described with reference to FIGS. 1(*a*) to 12, in which the same reference numerals as those in FIGS. 13 to 17 denote the same parts, and the detailed explanation thereof will be omitted hereinafter. Referring to FIGS. 1 to 7, reference numeral 28 generally denotes a label printer in the preferred embodiment according to the present invention. The label printer 28 includes a body housing 29 as a body frame accommodating a label printing section 3 and a sheet supplying section 4. The label printing section 3 is provided at a front portion in the body housing 29, and the sheet supplying section 4 is provided at a rear portion in the body housing 29. A label sheet 5 in the form of a roll is rotatably supported in the sheet supplying section 4. The label sheet 5 is constituted by an elongated base sheet 11 and a plurality of individual labels 10 separably attached to the base sheet 11. An image is printed on each label 10 in the label printing section 3. The label printing section 3 includes a bracket 6 pivotably supported to the body housing 29, a line head 7 mounted on the bracket 6, and a platen roller 8 rotatably supported to the body housing 29. The line head 7 is adapted to separably contact the platen roller 8. A label separating member 9 for separating each label 10 from the base sheet 11 is fixed to the body housing 29 at a position just before the platen roller 8 and substantially parallel thereto. The body housing 29 is constituted of a base 30, a first cover 31 and a second cover 32. The first cover 31 and the second cover 32 are provided on the base 30 so as to be laterally juxtaposed to each other. The first cover 31 is openably supported at a rear end thereof to a rear end of the base 30. The label printing section 3 and the sheet supplying section 4 are normally covered with the first cover 31. The second cover 32 houses a drive mechanism (not shown) or the like for driving the platen roller 8, and the base 30 houses a drive circuit (not shown) or the like for the drive mechanism and the line head 7.

Figure 1B:
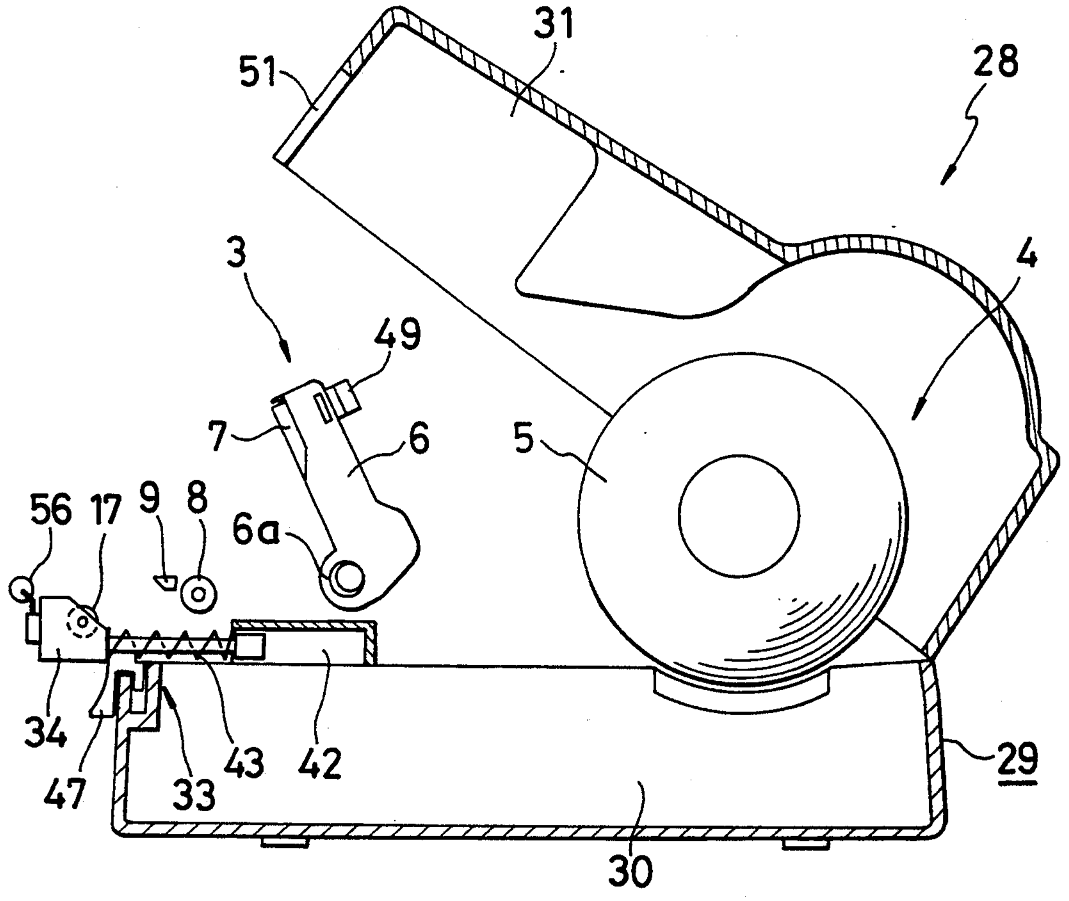
Figure 2:
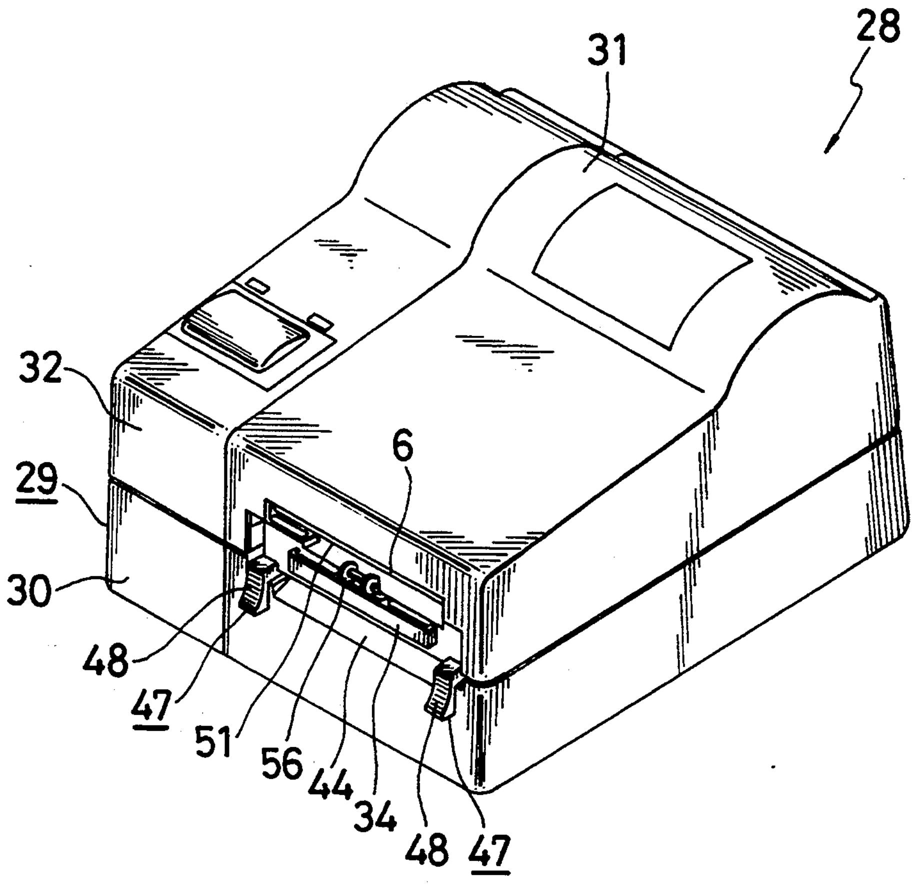
FIG. 2 is a perspective view of the label printer in the initial condition before setting a label sheet.
Figure 9:
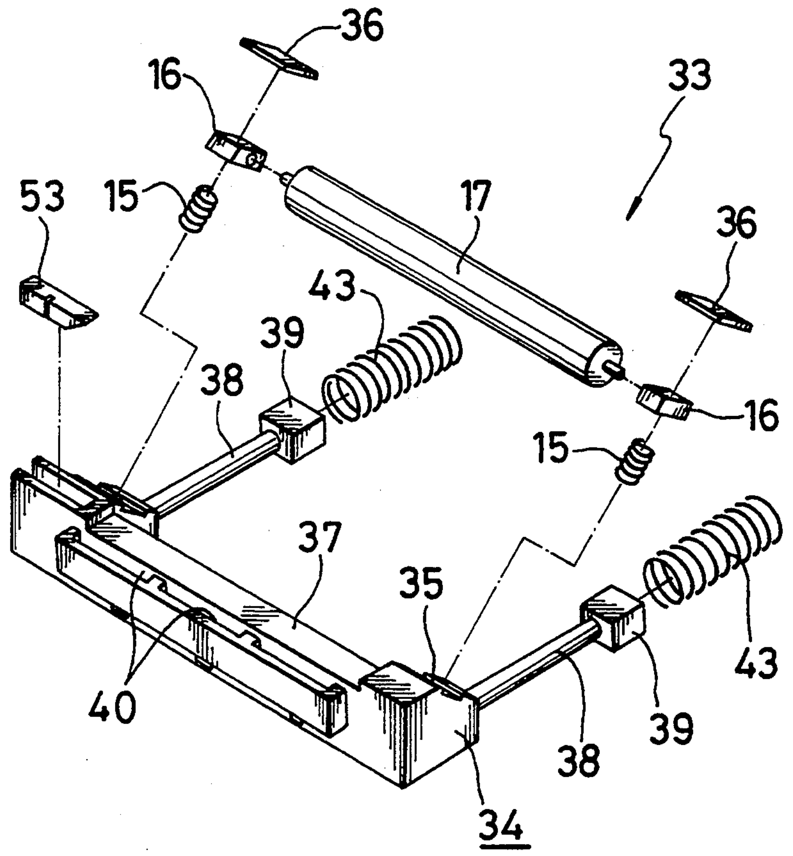
FIG. 9 is an exploded perspective view of a sheet eject unit including the slide frame and the pinch roller.

Referring to FIG. 9, there is shown an exploded perspective view of a sheet eject unit 33 for ejecting the base sheet 11 from which the labels 10 have been separated by the label :separating member 9. The sheet eject unit 33 includes a generally U-shaped slide frame 34 slidably mounted on the base 30 and a pinch roller 17 rotatably supported to the slide frame 34. The slide frame 34 is constructed of a frame body 37 parallel to the pinch roller 17, a pair of support shafts 38 extending rearward from the frame body 37 at the laterally opposite ends thereof, and a pair of stop blocks 39 formed at the rear ends of the support shafts 38, respectively. The slide frame 34 is adapted to move in a longitudinal direction of the base 30 between an advanced or contact position where the pinch roller 17 is in contact with the platen roller 8 as shown in FIG. 1A and a retracted or separate position where the pinch roller 17 is separated from the platen roller 8 as shown in FIG. 1B. The amount of movement of the slide frame 34 is set so that when the slide frame 34 comes to the separated position, the pinch roller 17 is positioned before the label separating member 9. An upper surface of the frame body 37 at its .opposite ends is provided with a pair of recesses 35. A pair of bearings 16 for rotatably supporting a roller shaft 17*a* of the pinch roller 17 are slidably received in the recesses 35 through a pair of coil springs 15, respectively. Further, a pair of retainer plates 36 are mounted on the upper surface of the frame body 37 so as to retain the bearings 16 against biasing force of the coil springs 15. Accordingly, the pinch roller 17 is normally biased by the coil springs 15 in an upward direction.

Figure 8:
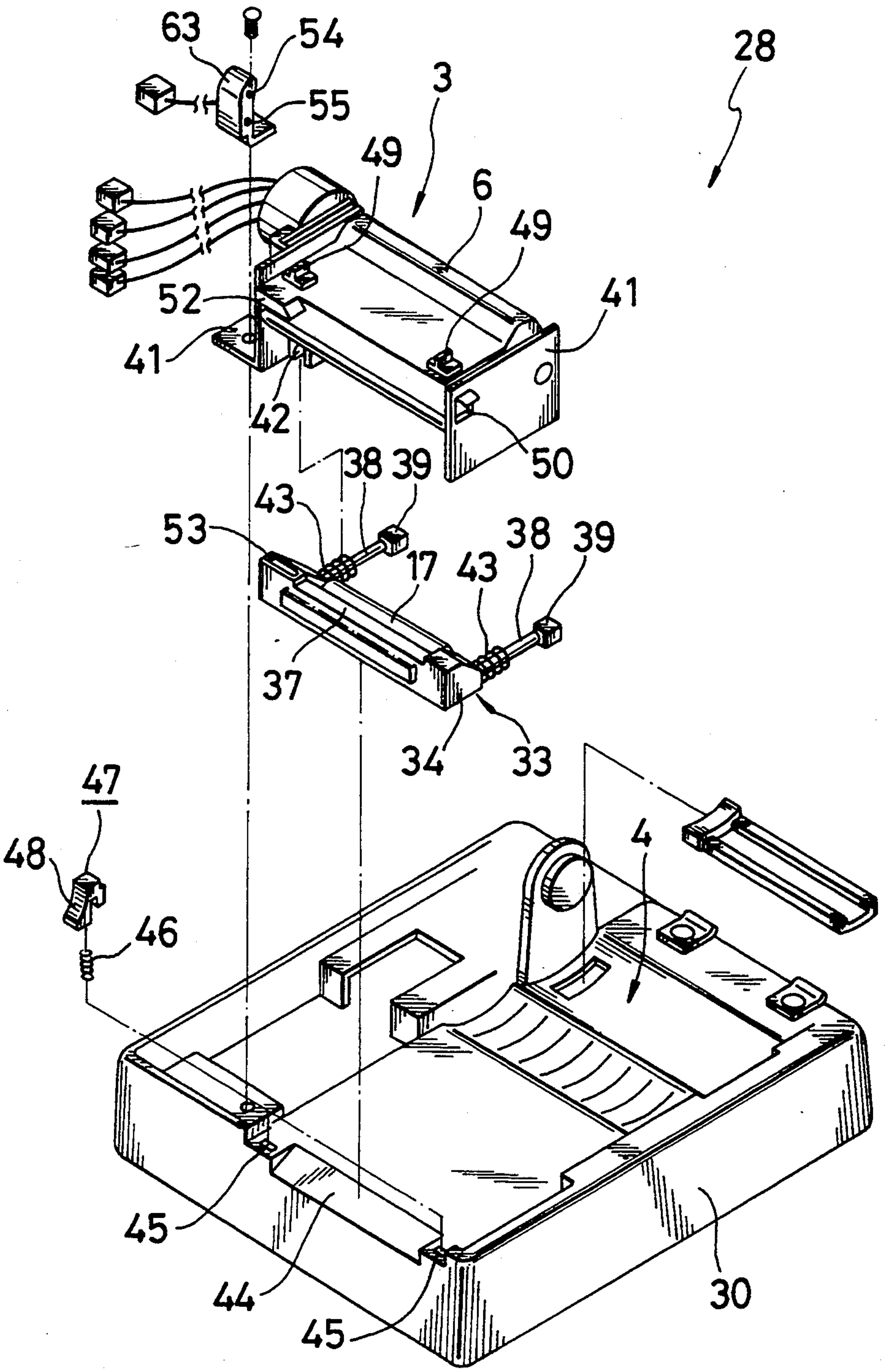
FIG. 8 is an exploded perspective view of an internal structure of the label printer.
Figure 10:
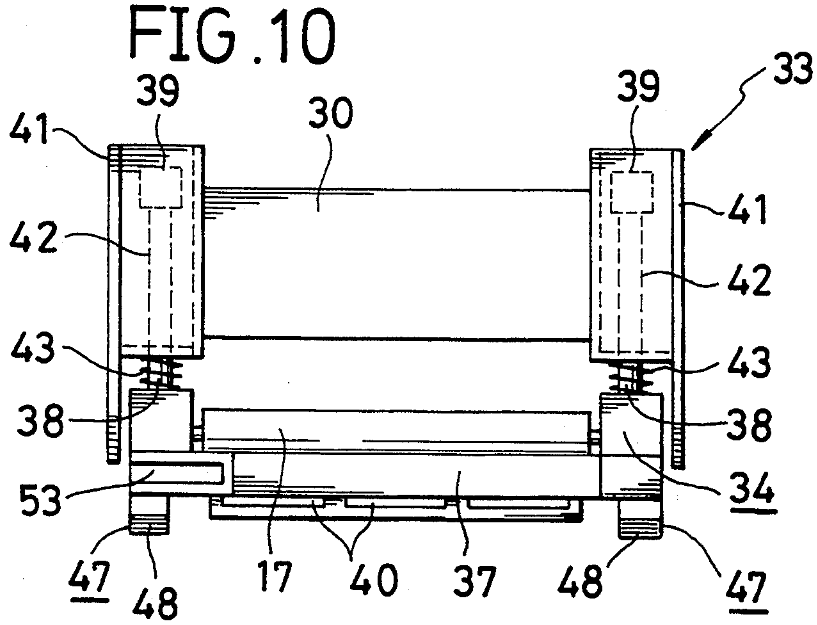
FIG. 10 is a top plan view of the sheet eject unit shown in FIG. 9.

As shown in FIG. 8, a pair of support frames 41 are fixedly mounted on the base 30 in laterally spaced relationship from each other. The bracket 6 mounting the line head 7 thereon is disposed between the support frames 41, and a pivotal shaft 6*b* for pivotably supporting the bracket 6 is fixedly mounted to the support frames 41. A pair of grooved portions 42 are formed at the bottoms of the support frames 41, respectively. As shown in FIG. 10, the support shafts 38 and the stop blocks 39 of the slide frame 34 are slidably received in the grooved portions 42 of the support frames 41, respectively. Further, a pair of coil springs 43 as frame biasing means are mounted around the support shafts 38, respectively, between the slide frame 34 and the support frames 41. Accordingly, the slide frame 34 is normally biased by the coil springs 43 toward the separate position of the slide frame 34. That is, the pinch roller 17 is normally biased by the coil springs 43 away from the platen roller 8.

Figure 12:
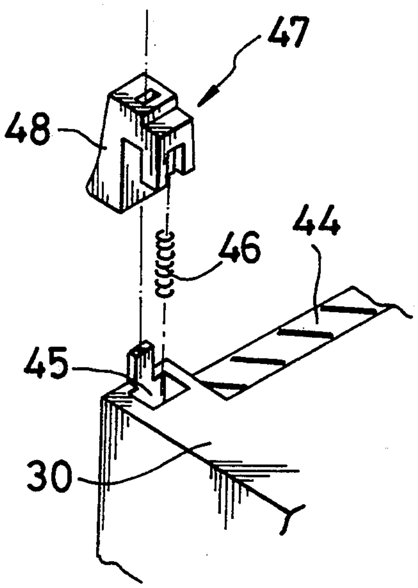
FIG. 12 is an exploded perspective view of a frame stopper and its associated parts.
Figure 13:
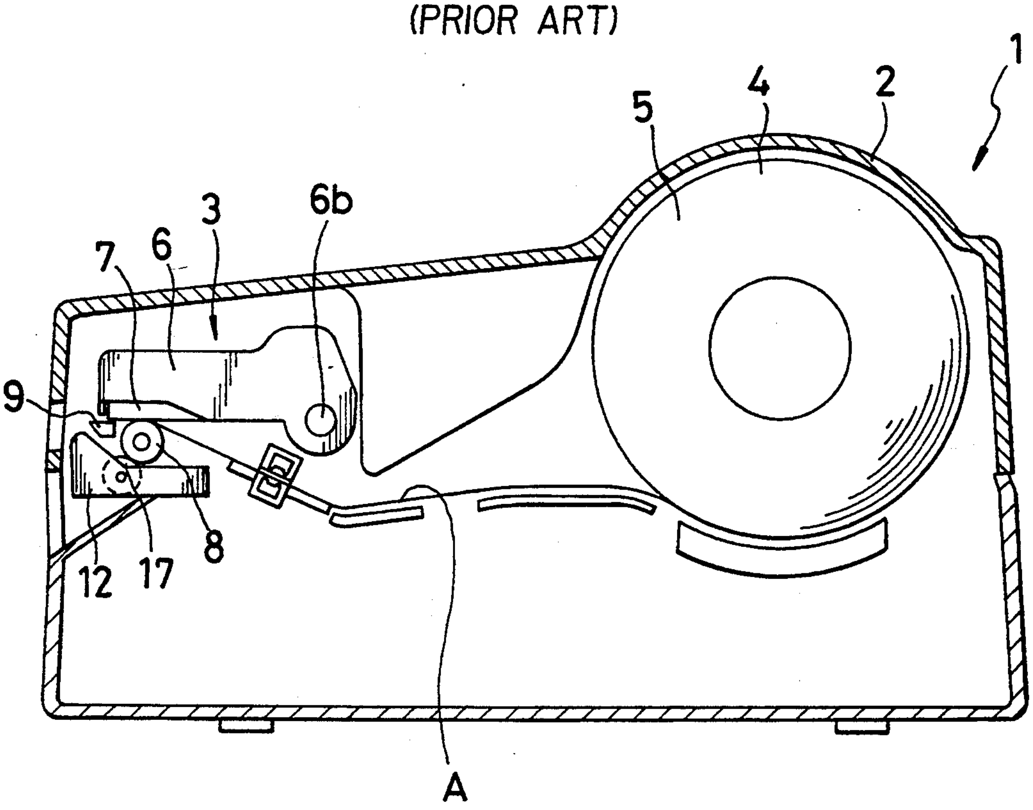
FIG.13 (PRIOR ART)
FIG. 13 is a vertical sectional view of a label printer in the related art.
Figure 14A:
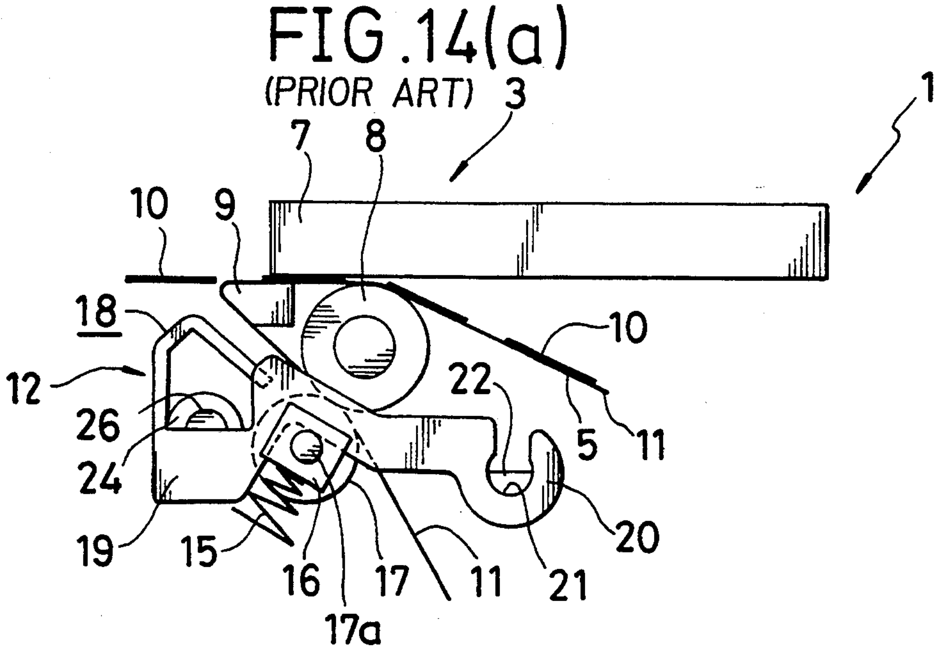
FIG.14(a) (PRIOR ART)
FIG. 14(*a*) is a schematic side view of an internal structure of the label printer shown in FIG. 13, illustrating a condition where a pinch roller is in contact with a platen roller.
Figure 14B:
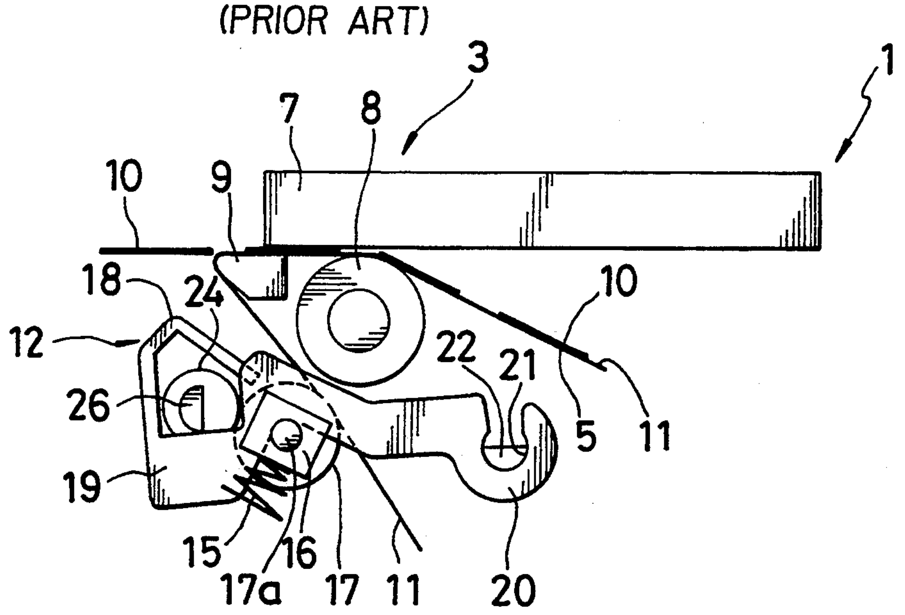
FIG.14(b) (PRIOR ART)
Figure 15:
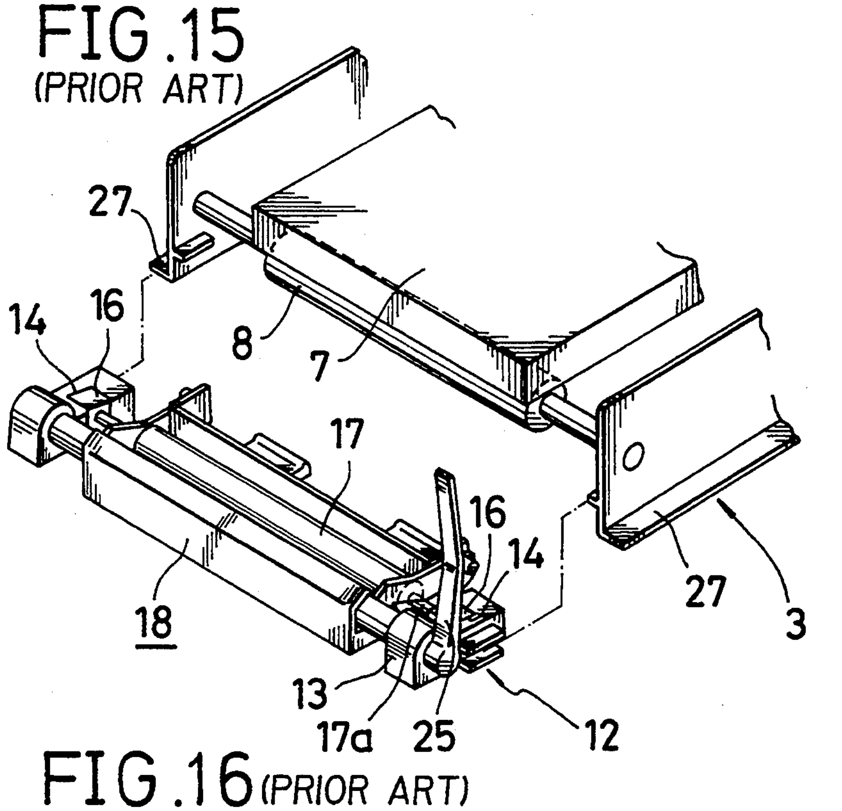
FIG.15 (PRIOR ART)
FIG. 15 is an exploded perspective view of the internal structure including a sheet eject unit in the label printer shown in FIG. 13.
Figure 16:
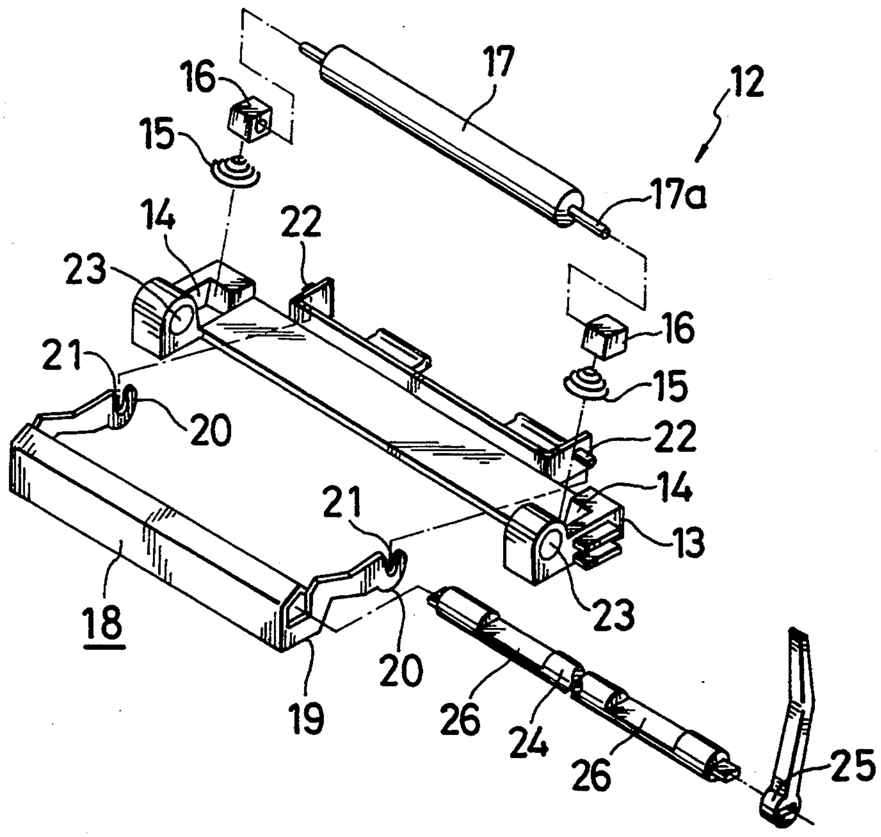
FIG.16 (PRIOR ART)
FIG. 16 is an exploded perspective view of the sheet eject unit shown in FIG. 15.
Figure 17:
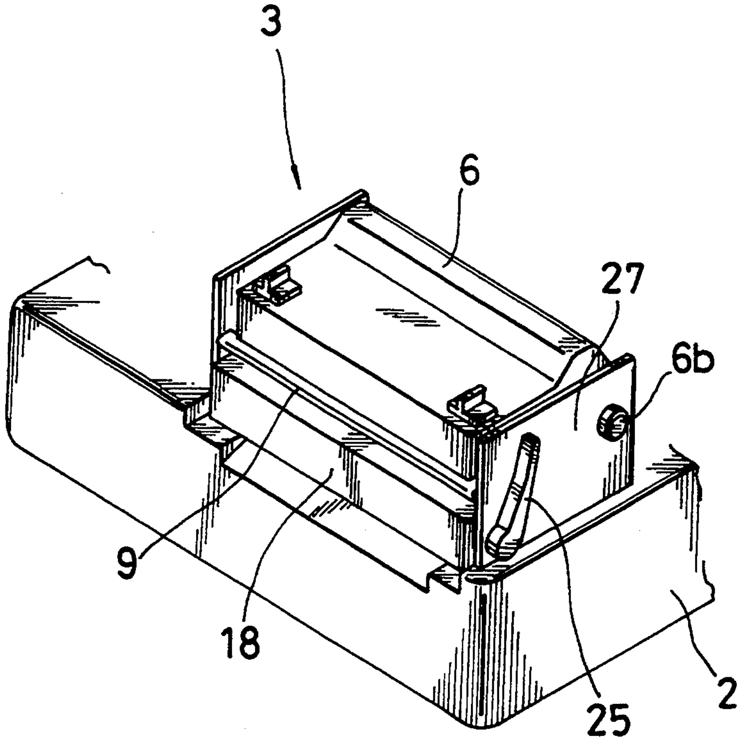
FIG. 17 (PRIOR ART)
FIG. 17 is a perspective view of a label printing section in the label printer shown in FIG. 13.

As shown in FIGS. 8 and 12, a sheet exit opening 44 for ejecting the base sheet 11 only is defined by forming an inclined surface at a front upper edge of the base 30. A pair of recesses 45 are formed on the upper surface of the base 30 in the vicinity of the laterally opposite ends of the sheet exit opening 44. A pair of frame stoppers 47 as frame positioning means are vertically slidably engaged with the recesses 45 through a pair of coil springs 46 as frame stopper biasing means, respectively. That is, the frame stoppers 47 are normally biased by the coil springs 46 in the upward direction. The front portions of the frame stoppers 47 are formed as manual operating portions 48 projecting from the front surface of the base 30. When the manual operating portions 48 are pushed down by an operator, the frame stoppers 47 are lowered in the recesses 45 against biasing force of the coil springs 46. The upper end portions of the frame stoppers 47 are adapted to detachably engage the front surface of the slide frame 34 of the sheet eject unit 33 against the biasing force of the coil springs 46. When the upper end portions of the frame stoppers 47 are engaged with the front surface of the slide frame 34 as shown in FIG. 1(*a*), the pinch roller 17 is held in the contact position with respect to the platen roller 8. In contrast, when the upper end portions of the frame stoppers 47 are disengaged from the front surface of the slide frame 34 by operating the manual operating portions 48 of the frame stoppers 47, the pinch roller 17 is brought into the separate position by the biasing force of the coil springs 43 as shown in FIG. 1(*b*). In the separate position of the pinch roller 17, the upper surfaces of the frame stoppers 47 abut against the support shafts 38 of the slide frame 34 as shown in FIG. 1(*b*), so that the escape of frame stoppers 47 from the recesses 45 is prevented by the slide frame 34. Further, in the separate position of the pinch roller 17, the stop blocks 39 formed at the rear ends of the support shafts 38 of the slide frame 34 abut against the inside front end surfaces of the grooved portions 42 of the support frames 41 as shown in FIG. 1(*b*), so that escape of the slide frame 34 from the support frames 41 is prevented by the stop blocks 39.

As shown in FIGS. 1(*a*), 1(*b*), 4 and 5, a pair of torsion springs 6*a* are mounted on the pivotal shaft 6*b* so as to normally bias the bracket 6 in the upward direction, that is, in such a direction as to move the line head 7 mounted on the bracket 6 away from the platen roller 8. A pair of head stoppers 49 are laterally displaceably mounted on the upper surface of the bracket 6 at the front, side portions thereof, and a pair of through holes 50 are formed through the support frames 41, respectively. The head stoppers 49 are adapted to detachably engage the through holes 50 of the support frames 41. When the head stoppers 49 are. engaged with the through holes 50, the line head 7 is held in contact with the platen roller 8 against the biasing force of the torsion springs 6*a* as shown in FIG. 1(*a*). In contrast, when the head stoppers 49 are disengaged from the through holes 50, the line head 7 is brought into separation from the platen roller 8 by the biasing force of the torsion springs 6*a*. Further, the front wall of the first cover 31 is recessed from its lower edge to form a label issue opening 51 for issuing the label 10 separated from the base sheet 11.

As shown in FIG. 8, a first prism 52 is mounted on the bracket 6 at the front end thereof, and a second prism 53 is mounted on the slide frame 34 at the front end thereof. The first prism 52 and the second prism 53 are opposed to each other in the condition shown in FIG. 1(*a*). A light emitting element 54 and a light receiving element 55 are provided so as to face the lateral ends of the first and second prisms 52 and 53, respectively. The light emitting element 54 and the light receiving element 55 are fixedly mounted in a mounting member 63 which is fixed to the upper surface of the base 30. Thus, an optical path is formed to lead from the light emitting element 54 through the first and second prisms 52 and 53 to the light receiving element 55 in the condition shown in FIG. 1A. When the bracket 6 is raised to separate the line head 7 from the platen roller 8, or the slide frame 34 is slid forward to separate the pinch roller 17 from the platen roller 8, the optical path is cut, and this condition is detected from an output of the light receiving element 55 by a control circuit (not shown) to stop driving the line head 7 and the platen roller 8. Furthermore, as a part of the optical path between the prisms 52 and 53 intersects a feed path of each label 10 to be issued, the light receiving element 55 functions also as a sensor for detecting whether or not each label 10 is present at the label issue opening 51. Such an optical system has already been disclosed in Japanese Utility Model Application No. Hei 4-7207 and Japanese Patent Application No. Hei 4-106676 both filed by Tokyo Electric Co., Ltd., the employer of the present applicant.

Figure 11:
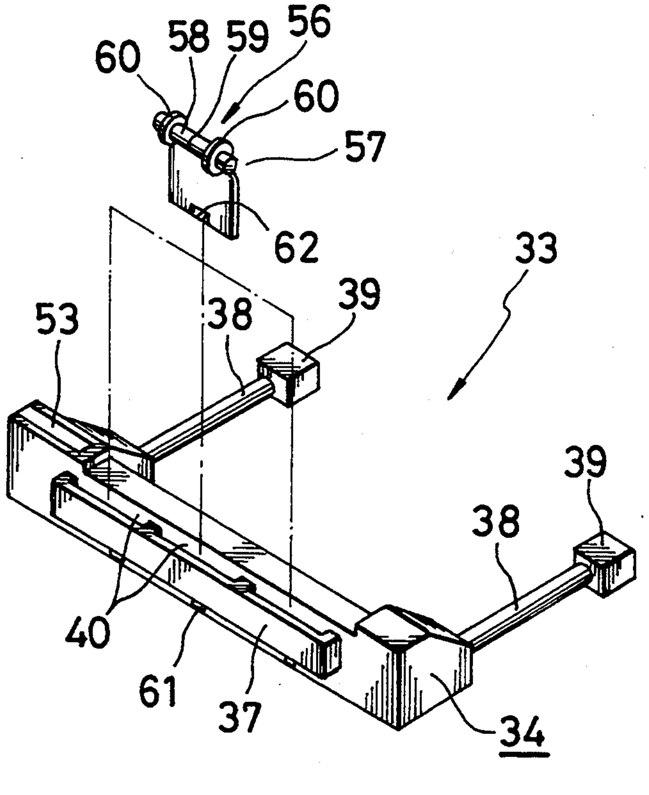
FIG. 11 is an exploded perspective view of a label supporting roller unit and its associated parts.

Referring to FIG. 11, reference numeral 56 denotes a roller unit for supporting a lower surface of each label 10 issued from the label issue opening 51 to prevent the label 10 from curving. The roller unit 56 is constituted of a roller member 58 and a support member 57 for rotatably supporting the roller member 58. The roller member 58 is constituted of a cylindrical portion 59 rotatably supported to the support member 57 and a pair of disks 60 formed on the cylindrical portion 59 at the opposite ends thereof, so that the lower surface of each label 10 issued from the label issue opening 51 is supported by the rotatable disks 60 so as to prevent undue sticking of the label 10 to the outer circumferences of the disks 60. A holder 37*a* for holding the roller unit 56 is formed on the front surface of the frame body 37 of the slide frame 34. The holder 37*a* has three independent holding holes 60 each for receiving the support member 57 of the roller unit 56. Further, three pawls 61 are formed on the front surface of the frame body 37 so as to correspond to the respective holding holes 40. The support member 57 of the roller unit 56 is formed at its lower end with a through hole 62 adapted to releasably engage each pawl 61. When each label 10 has a small width, the single roller unit 56 is engaged with the central holding hole 40, while when each label 10 has a large width, the two roller units 56 are engaged with the two outside holding holes 40.

In the label printer 28 mentioned above, a given image such as commodity information is printed on each label 10 of the label sheet 5 carried on the platen roller 8 by thermal scanning of the line head 7. After printing the image, the base sheet 11 is bent at an acute angle by the label separating member 9 to separate each label 10 from the base sheet 11 and project a front half portion of the label 10 from the label issue opening 51. After separating the label 10 from the base sheet 11, the base sheet 11 only is fed by the platen roller 8 and the pinch roller 17, and is ejected from the sheet exit opening 44. In this manner, the issue of the plurality of labels 10 is continuously performed.

As mentioned above, the front half portion of each label 10 on which the image has been printed by the line head 7 is separated from the base sheet 11 and projects from the label issue opening 51. Accordingly, the operator can easily draw the issued label 10 from the label issue opening 51 and attach it to a commodity (not shown), for example.

Figure 3:
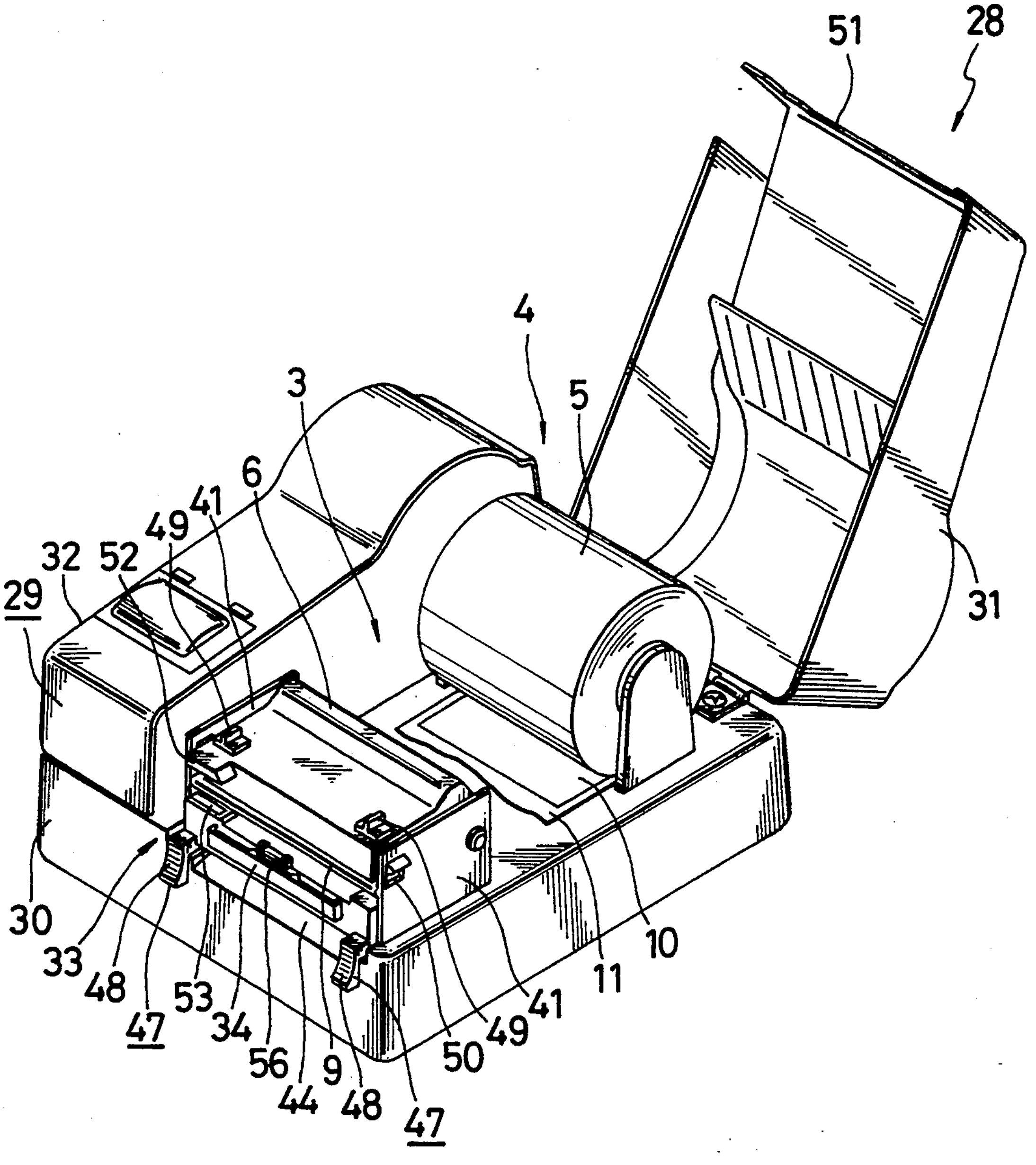
FIG. 3 is a perspective view of the label printer in the condition where a cover is opened.
Figure 4:
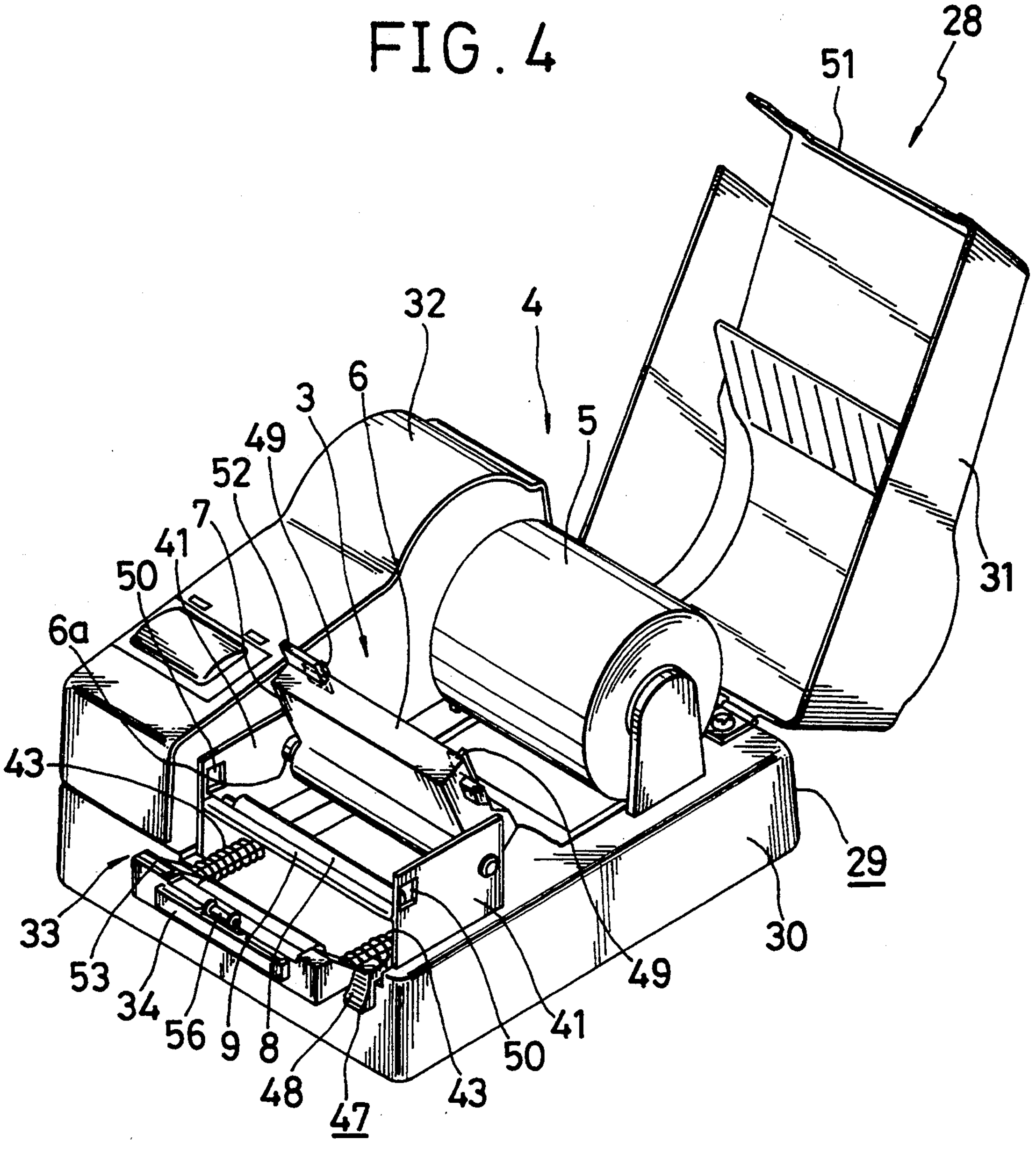
FIG. 4 is a perspective view of the label printer in the condition where a line head and a slide frame are released.

Now, a method of setting the label sheet 5 in the label printer 28 will be described with reference to FIGS. 1(*a*) to 7. As shown in FIGS. 1(*a*) and 2, the first cover 31 is initially in the closed position where the label printing section 3 and the sheet supplying section 4 are covered. First, as shown in FIG. 3, the first cover 31 is opened to expose the label printing section 3 and the sheet supplying section 4. In this open condition of the first cover 31, the head stoppers 49 mounted on the bracket 6 are laterally inward displaced to be disengaged from the through holes 50 of the support frames 41. As a result, as shown in FIGS. 1(*b*) and 4, the bracket 6 is swung upward by the biasing force of the torsion springs 6*a*, and the line head 7 mounted on the bracket 6 is accordingly separated from the platen roller 8. Further, the frame stoppers 47 are lowered to be disengaged from the slide frame 34. As a result, as shown in FIGS. 1B and 4, the slide frame 34 is forward slid by the biasing force of the coil springs 43, and the pinch roller 17 supported to the slide frame 34 is accordingly separated from the platen roller 8.

Figure 5:
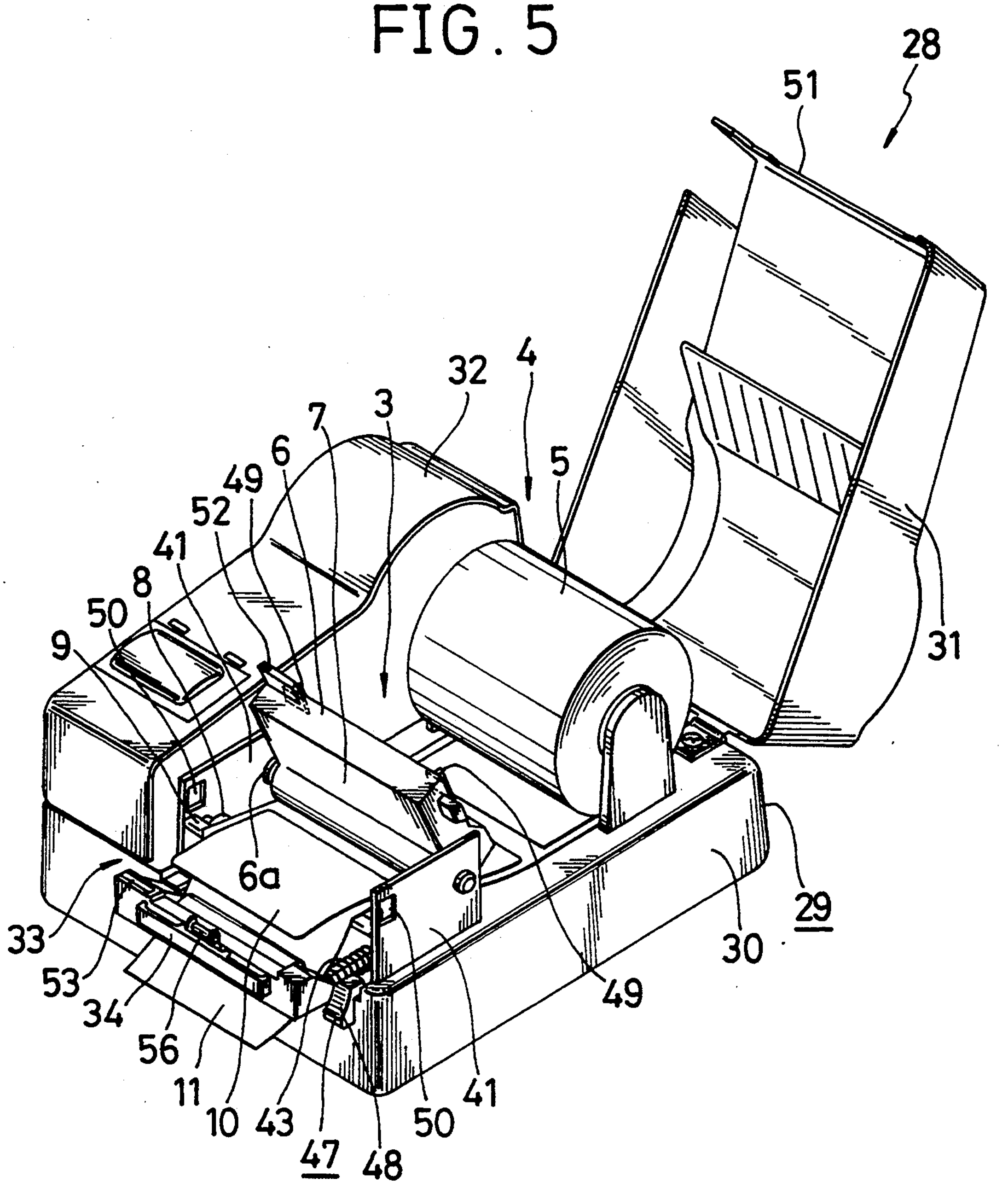
FIG. 5 is a perspective view of the label printer in the condition where a base sheet constituting the label sheet is inserted between the platen roller and the pinch roller with the line head and the slide frame held in the respective released positions.
Figure 6:
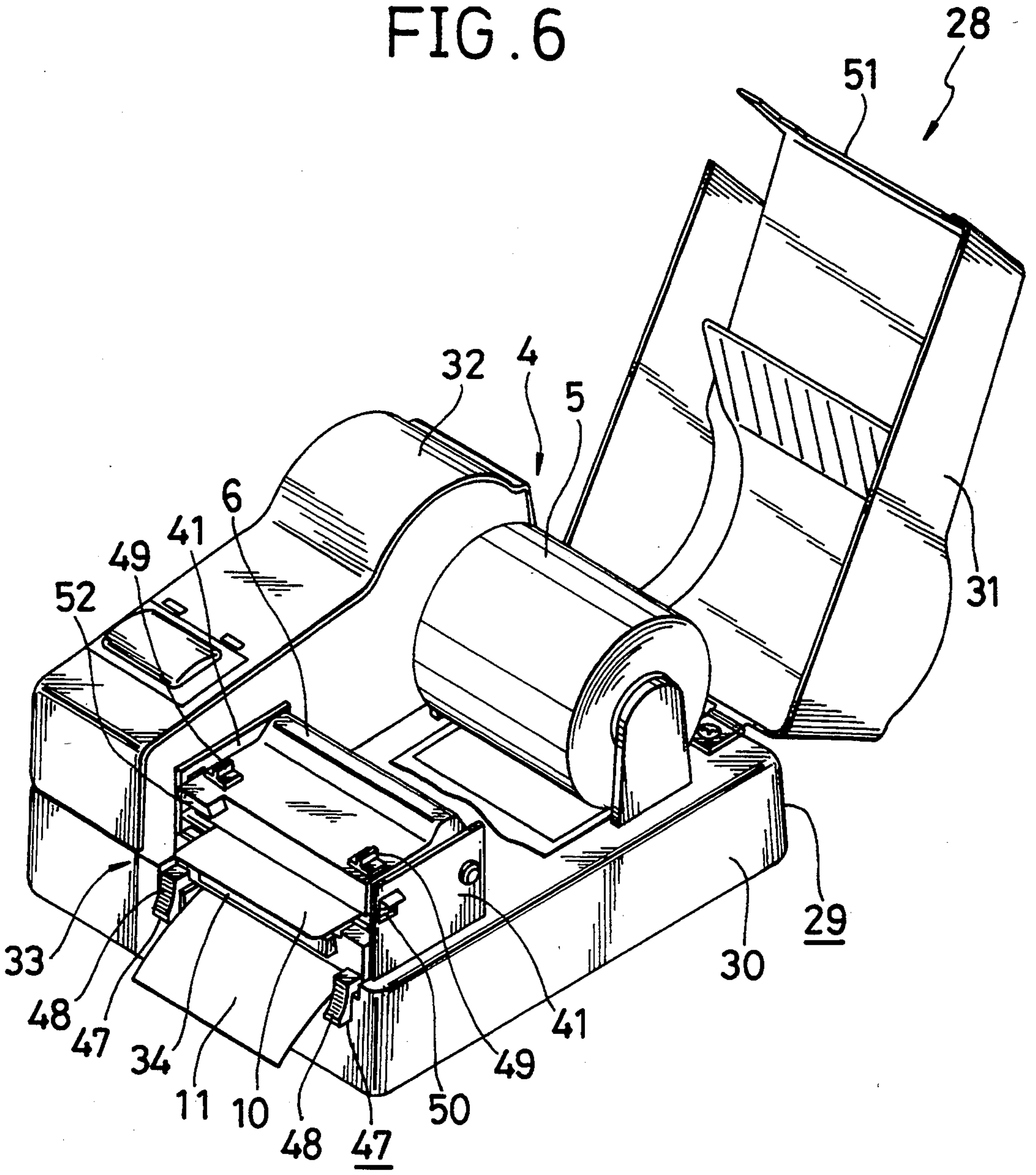
FIG. 6 is a perspective view of the label printer in the condition where the line head and the slide frame are returned to their respective initial positions to set the label sheet.
Figure 7:
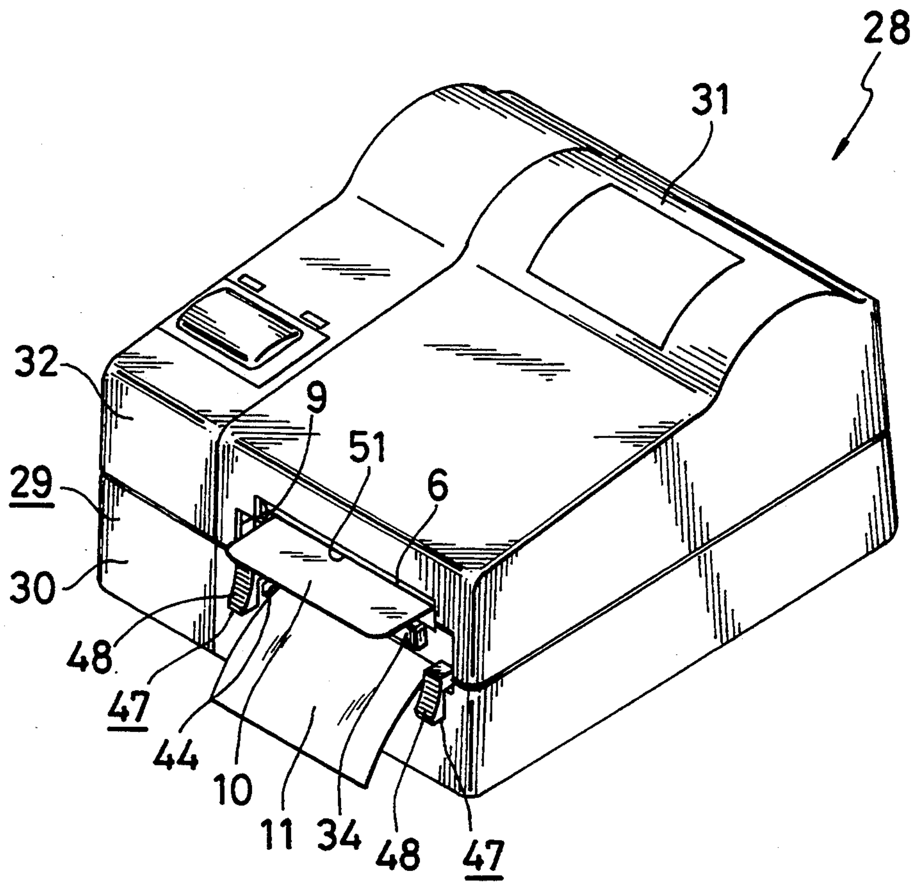
FIG. 7 is a perspective view of the label printer in the condition where the cover is closed after setting the label sheet.

In this condition, as shown in FIG. 5, the label sheet 5 unwounded from the roll stored in the sheet supporting section 4 is inserted through the space defined between the line head 7 and the platen roller 8. Then, the label sheet 5 is put on the label separating member 9, and the base sheet 11 only of the label sheet 5 is inserted through the space defined between the platen roller 8 and the pinch roller 17. In this condition, the front half portion of the foremost label 10 is separated from the base sheet 11 as shown in FIG. 5. Then, the slide frame 34 is pushed to return to its initial position against the biasing force of the coil springs 43. As a result, the frame stoppers 47 are raised to its initial position by the biasing force of the coil springs 46, and come in to engagement with the front surface of the slide frame 34 again as shown in FIG. 6. Accordingly, the pinch roller 17 comes in to pressure contact with the platen roller 8 through the base sheet 11. Further, the bracket 6 is depressed down to its initial position against the biasing force of the torsion springs 6*a*, and then, the head stoppers 49 are laterally outward displaced to be engaged with the through holes 50 of the support frames 41 again as shown in FIG. 6. As a result, the line head 7 comes to pressure contact with the platen roller 8 through the label sheet 5. Then, the first cover 31 is closed as shown in FIG. 7. In this closed condition of the first cover 31, the label sheet 5 is set in such a condition that the foremost label 10 is issued from the label issue opening 51 and the base sheet 11 is ejected from the sheet exit opening 44 as shown in FIG. 7.

According to the above preferred embodiment, the slide frame 34 can be greatly slid to ensure a large amount of movement of the pinch roller 17 supported to the slide frame 34. Accordingly, the pinch roller 17 can be greatly separated from the platen roller 8, so that the base sheet 11 can be easily inserted through the space defined between the platen roller 8 and the pinch roller 17.

Further, when the frame stoppers 47 are depressed down by operating the manual operating portions 48 in the contact position of the pinch roller 17 with respect to the platen roller 8, the slide frame 34 is disengaged from the frame stoppers 47 to automatically slide forward by the biasing force of the coil springs 43. Thereafter, when the slide frame 34 is pushed rearward to the initial position, the frame stoppers 47 are automatically returned to the initial position by the biasing force of the coil springs 46, and come to engagement with the slide frame 34 again. Accordingly, the setting operation of the label sheet 5 can be made simple to improve operability. In particular, the frame stoppers 47 can be lowered by simply pushing down the manual operating portions 48 with the fingers of the operator.

Further, the frame stoppers 47 are simple in structure such that they are adapted to engage the slide frame 34 in a direction perpendicular to a sliding direction of the slide frame 34. In addition, the escape of the frame stoppers 47 from the recesses 45 of the body 30 is prevented by the slide frame 34. Accordingly, no special structure for preventing the escape of the frame stoppers 47 is needed, thereby simplifying the structure of the label printer.

Further, when the frame stoppers 47 are pushed down, the slide frame 34 is automatically slid forward by the biasing force of the coil springs 43. That is, the operator need not slide the slide frame 34, thereby improving the operability.

Further, since means for biasing the frame stoppers 47 is constituted of the coil springs 46 only, the structure of the stopper biasing means can be made simple.

The slide frame 34 has the stop blocks 39 as means for preventing the escape of the slide frame 34 from the grooved portions 42 of the support frames 41. That is, the sliding operation of the slide frame 34 by the biasing force of the coil springs 43 is stopped by the abutment of the stop blocks 39 against the front inside surfaces of the grooved portions 42. Accordingly, the operator need not carry out operation for preventing the escape of the slide frame 34, thereby improving the operability.

In a modification, a coil spring or the like for biasing the slide frame 34 in a direction such that the pinch roller 17 comes to contact with the platen roller 8 may be provided as the frame biasing means and the frame positioning means. In this case, the pinch roller 17 comes to contact with the platen roller 8 by the frame biasing means, and the frame stoppers 47 are positioned by the frame biasing means. In setting the label sheet 5, the frame stoppers 47 are lowered by the operator, and the slide frame 34 is manually drawn from the body 30 to the separate position. When the slide frame 34 reaches the separate position, the frame stoppers 47 are raised by the biasing force of the coil springs 46 to come to engagement with the slide frame 34, thus maintaining the slide frame 34 at the separate position. Accordingly, the base sheet 11 can be easily inserted through the space defined between the platen roller 8 and the pinch roller 17.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A label printer comprising:

a body housing;

a platen roller rotatably supported by said body housing, for carrying a label sheet including an elongated base sheet and a plurality of labels separably attached to the base sheet;

a line head adapted to separably contact said platen roller through the label sheet, for printing an image on the labels;

a label separating member for bending the base sheet at an acute angle after printing of the image to separate the labels from the base sheet;

a pinch roller for separably contacting said platen roller through the base sheet after separating of the labels;

a slide frame including at least one support shaft slidably supported by said body housing for movement in a longitudinal direction of said body housing and for supporting said pinch roller so that said pinch roller is slidably movable with said slide frame between a contact position and a separated position with respect to said platen roller; and a frame positioning mechanism protecting from a front surface portion of the base housing for releasably holding said slide frame in said contact position where said pinch roller is in contact with said platen roller.

2. The label printer as defined in claim 1, wherein said slide frame is slidable an amount such that a space is defined between said label separating member and said pinch roller separated from said platen roller and wherein the at least one support shaft comprises a pair of support shafts.

3. The label printer as defined in claim 1, wherein said slide frame is slidable by an amount such that said pinch roller separated from said platen roller is movable outward from said body frame.

4. The label printer as defined in claim 1, wherein said slide frame is provided with a stop block for holding said slide frame in the separated position where said pinch roller is separated from said platen roller.

5. The label printer as defined in claim 1, wherein said frame positioning mechanism comprises a frame stopper slidable in a direction perpendicular to a sliding direction of said slide frame, said frame stopper releasably engaging said slide frame in the contact position where said pinch roller is in contact with said platen roller, such that when said frame stopper is slid in the direction perpendicular to the sliding direction of said slide frame, said frame stopper is held in the contact position of the pinch roller with respect to the platen roller by said frame stopper.

6. The label printer as defined in claim 5, wherein said frame stopper is provided with a manual operating portion adapted to be manually operated to slide said frame stopper.

7. The label printer as defined in claim 5, wherein said frame stopper is retained to said body frame by said slide frame.

8. The label printer as defined in claim 5, further comprising a frame stopper biasing mechanism for biasing said frame stopper toward said slide frame.

9. The label printer as defined in claim 1, wherein said frame positioning mechanism comprises a frame biasing mechanism for biasing said at least one support shaft of said slide frame in the longitudinal direction of said frame housing direction so as to bring said pinch roller into contact with said platen roller.

10. The label printer as defined in claim 9, wherein said frame biasing mechanism comprises a coil spring.

11. The label printer as defined in claim 1, further comprising a frame biasing mechanism for biasing said slide frame in a direction so as to separate said pinch roller from said platen roller.

12. The label printer as defined in claim 11, wherein said frame biasing mechanism comprises a coil spring.

13. A label printer comprising:

a body housing;

a platen roller rotatably supported to said body housing, for carrying a label sheet including an elongated base sheet and a plurality of labels separably attached to the base sheet;

a line head pivotably supported to said body housing for separably contacting said platen roller through the label sheet, for printing an image on the labels;

a label separating member for bending the base sheet at an acute angle after printing of said image to separate the labels from the base sheet;

a pinch roller adapted to separably contact said platen roller through the base sheet after separating of the labels;

a slide frame including at least one support shaft slidably supported by said body housing for movement in a longitudinal direction of said body housing for supporting said pinch roller so that said pinch roller is movable between a contact position and a separated position with respect to said platen roller; and a frame positioning mechanism projecting from a front surface portion of the base housing for releasably holding said slide frame in the contact position where said pinch roller is in contact with said platen roller.

14. The label printer as defined in claim 13, wherein said slide frame is slidable an amount such that a space is defined between said label separating member and said pinch roller separated from said platen roller and wherein the at least one support shaft comprises a pair of support shafts.

15. The label printer as defined in claim 13, wherein said frame positioning mechanism comprises a frame stopper slidable in a direction perpendicular to a sliding direction of said slide frame, and said frame stopper releasably engages said slide frame in the contact position where said pinch roller is in contact with said platen roller, such that when said frame stopper is slid in the direction perpendicular to the sliding direction of said slide frame, said frame stopper is held in the contact position by said frame stopper.

16. The label printer as defined in claim 13, wherein said frame positioning mechanism comprises a frame biasing mechanism for biasing said slide frame in a direction so as to bring said pinch roller into contact with said platen roller.

17. The label printer as defined in claim 13, which comprises a frame biasing mechanism for biasing said slide frame in a direction so as to separate said pinch roller from said platen roller.

18. A label sheet setting method in a label printer comprising a body housing; a platen roller rotatably supported to said body housing, for carrying a label sheet which includes an elongated base sheet and a plurality of labels separably attached to the base sheet; a line head for separably contacting said platen roller through the label sheet, for printing an image on the labels; a label separating member for bending the base sheet at an acute angle after printing of the image to separate the labels from the base sheet; a pinch roller adapted to separably contact said platen roller through the base sheet after separating of the labels; a slide frame including at least one support shaft slidably supported on said body housing in a longitudinal direction of said body housing for supporting said pinch roller so that said pinch roller is movable between a contact position and a separated position with respect to said platen roller; and a frame positioning mechanism for releasably holding said slide frame in the contact position where said pinch roller is in contact with said platen roller; said method comprising steps of:

separating said line head from said platen roller and then inserting a leading portion of the label sheet through a space defined between said platen roller and said line head separated from said platen roller and said line head separated from said platen roller;

sliding said at least one support shaft of said slide frame in the longitudinal direction of the housing to separate said pinch roller from said platen roller and then inserting a leading portion of the base sheet separated from a foremost one of the labels through a space defined between said platen roller and said pinch roller separated from said platen roller;

bringing said line head into contact with said platen roller through the label sheet and then sliding said at least one support shaft of said slide frame in the longitudinal direction of the housing to bring said pinch roller into contact with said platen roller; and releasably holding said slide frame at a front surface portion of said base housing by said frame positioning mechanism.

* * * * *